United States Patent
Battocchio

(10) Patent No.: US 9,413,061 B2
(45) Date of Patent: Aug. 9, 2016

(54) ELECTRONIC ASSEMBLY FOR INSTALLATION IN A TYRE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventor: Claudio Battocchio, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 95 days.

(21) Appl. No.: 14/361,051

(22) PCT Filed: Nov. 22, 2012

(86) PCT No.: PCT/FR2012/052701
§ 371 (c)(1),
(2) Date: May 28, 2014

(87) PCT Pub. No.: WO2013/079854
PCT Pub. Date: Jun. 6, 2013

(65) Prior Publication Data

US 2014/0333492 A1 Nov. 13, 2014
US 2015/0311583 A2 Oct. 29, 2015

(30) Foreign Application Priority Data

Dec. 2, 2011 (FR) ..................................... 11 61107

(51) Int. Cl.
*H01Q 1/32* (2006.01)
*B60C 23/04* (2006.01)
(Continued)

(52) U.S. Cl.
CPC ............ *H01Q 1/325* (2013.01); *B29D 30/0061* (2013.01); *B60C 19/00* (2013.01); *B60C23/0452* (2013.01); *B60C 23/0493* (2013.01); *H01Q 1/20* (2013.01); *B29D 2030/0077* (2013.01); *B29D 2030/0083* (2013.01)

(58) Field of Classification Search
CPC ........... H01Q 1/32; H01Q 1/325; H01Q 1/20; B06C 19/08; B06C 23/0493
USPC ........................................ 343/711; 152/152.1
See application file for complete search history.

(56) References Cited

U.S. PATENT DOCUMENTS 5,852,099 A 12/1998 Vanel ............................ 524/494
6,147,659 A * 11/2000 Takahashi ............. B60C 9/2006
340/572.1

(Continued)

FOREIGN PATENT DOCUMENTS

CN 1736742 A 2/2006
CN 101528450 A 9/2009
(Continued)

OTHER PUBLICATIONS

J. Zhu, "Non-metallic Material and the application thereof," Hubei Science and Technology Press, Feb. 29, 1992 (in Chinese; partial English translation attached).

*Primary Examiner* — Hoang V Nguyen
(74) *Attorney, Agent, or Firm* — Fitzpatrick, Cella, Harper & Scinto

(57) ABSTRACT

An electronic assembly, which is intended for installation in a tire, includes an electronic device and a transition layer. The electronic device includes an electronic member and at least one antenna fixed to a support of the electronic member. Each antenna includes a free part, which is free with respect to the support, joined to a fixing part, which fixes the antenna to the support. The transition layer is formed of a composition that includes 9 to 13 parts of sulfur per hundred parts by weight of elastomer. The transition layer coats at least a junction between the free part and the fixing part of each antenna.

11 Claims, 1 Drawing Sheet

(51) Int. Cl.
 *B29D 30/00* (2006.01)
 *B60C 19/00* (2006.01)
 *H01Q 1/20* (2006.01)

(56) References Cited

U.S. PATENT DOCUMENTS

| | | | |
|---|---|---|---|
| 7,900,667 B2 | 3/2011 | Vasseur | 152/209.1 |
| 8,430,142 B2 * | 4/2013 | Incavo | B60C 23/0493 |
| | | | 152/152.1 |
| 8,672,003 B2 | 3/2014 | Battocchio et al. | 152/152.1 |
| 8,685,527 B2 | 4/2014 | Cubizolle et al. | 428/172 |
| 2006/0038665 A1 | 2/2006 | Jang | 340/426.33 |
| 2008/0035259 A1 * | 2/2008 | Mancosu | B29D 30/0662 |
| | | | 152/246 |
| 2009/0151828 A1 * | 6/2009 | Zhao | B60C 23/0493 |
| | | | 152/152.1 |
| 2009/0151829 A1 * | 6/2009 | Lionetti | B60C 23/0493 |
| | | | 152/152.1 |
| 2010/0276563 A1 | 11/2010 | Cubizolle et al. | 248/633 |
| 2011/0032174 A1 | 2/2011 | Sinnett et al. | 343/885 |
| 2011/0226401 A1 | 9/2011 | Battocchio et al. | 152/548 |
| 2012/0305151 A1 | 12/2012 | Robert | 152/152.1 |
| 2013/0112324 A1 | 5/2013 | Battocchio | 152/151 |

FOREIGN PATENT DOCUMENTS

| | | |
|---|---|---|
| CN | 102017343 A | 4/2011 |
| EP | 0 735 088 A1 | 10/1996 |
| EP | 1 085 046 A2 | 3/2001 |
| EP | 1 439 079 A2 | 7/2004 |
| EP | 2 223 814 A1 | 9/2010 |
| WO | WO 02/10269 A2 | 2/2002 |
| WO | WO 2008/046430 A1 | 4/2008 |
| WO | WO 2011/073601 A2 | 6/2011 |

* cited by examiner

ELECTRONIC ASSEMBLY FOR INSTALLATION IN A TYRE

FIELD OF THE INVENTION

The invention relates to the field of tyres, and in particular to that of electronic devices for installation in tyres. The invention is applicable to any type of tyre.

RELATED ART

A tyre comprising an electronic device is known from the prior art. The electronic device comprises an electronic member comprising an electronic chip fixed on a support and an antenna comprising two branches placed on each side of the electronic member and soldered to the support so as to provide a mechanical and electrical connection between each branch and the support. Each branch comprises a part which is free with respect to the support, joined to a part for fixing the branch to the support. The electronic device is integrated into the tyre, being embedded in rubber in the present case.

The antenna is of helical shape and its stiffness is such that it follows the deformations of the tyre rubber in use, i.e., while rolling. On the other hand, the electronic member has a generally parallelepipedal shape and a stiffness considerably greater than that of the rubber adjacent to the electronic device, such that it does not follow the deformations of the adjacent rubber.

Because of the difference in deformation between the antenna and the electronic member, the junction between the free part and the fixing part shows an increased risk of breakage under the effect of the stresses caused by the deformation of the tyre in use.

A first solution is to create a gradient of the modulus of elasticity between the junction and the adjacent rubber, so as to reduce the difference between deformations and eliminate the risks of breakage of the junction. The electronic device is therefore coated with a plurality of layers, each layer having a different modulus of elasticity. However, this solution gives rise to relatively high costs, problems of adhesion of the different layers to each other, and problems of compatibility of the materials of the different layers.

A second solution is that of eliminating the soldered fixing of each branch to the support and replacing it with a fixing of the capacitive type, that is to say one without galvanic contact between the antenna and the support. However, if the device is of the RFID (the English abbreviation for "Radio Frequency Identification Device") type, this solution gives rises to a deterioration of the radio frequency operation of the device, difficulties in controlling the distance between the support and each branch, and variations in the radio frequency performance over time as a result of the variation of the magnetic properties of the rubber over time.

BRIEF DESCRIPTION OF EMBODIMENTS OF THE INVENTION

The purpose of the invention is to eliminate, or at least reduce, the risks of breakage of the junction between the free part and the fixing part of the antenna.

For this purpose, the object of the invention relates to an electronic assembly for installation in a tyre, comprising:

an electronic device having an electronic member and at least one antenna fixed to a support of the electronic member, the antenna comprising a part which is free with respect to the support, joined to a part for fixing the antenna to the support, and a layer, called the transition layer, including a composition comprising an elastomer and 9 to 13 parts of sulphur per hundred parts by weight of elastomer, and coating at least the junction between the free and fixing parts of the antenna.

The composition provides a continuous transition between an area with a high modulus of elasticity, in this case the junction between the free and fixing parts of the antenna, and an area with a low modulus of elasticity, in this case the adjacent rubber coating the transition layer. This is because, during the vulcanization of the green tyre blank, the sulphur migrates into the adjacent rubber, which generally has a lower sulphur content than the rubber of the transition layer. Thus a gradient of the modulus of elasticity is created between the rigid area and the flexible area. The adjacent rubber coating the transition layer may be any of the rubbers of the tyre bead, such as a bead filler, an internal reinforcer, or a carcass ply, or a plurality of these rubbers.

The sulphur enables the rubber to pass from its plastic state to its elastic state during vulcanization. As the sulphur content rises, the stiffness of the resulting vulcanized rubber increases. Because of the relatively high sulphur content of the composition with respect to the sulphur content of the adjacent rubber, the sulphur migrates by diffusion during vulcanization to create the desired gradient of the modulus of elasticity.

By way of example, the MA10 modulus of the vulcanized rubber located in contact with the rigid area is in the range from 35 MPa to 70 MPa, and the MA10 modulus of the vulcanized rubber located between 0.5 mm and 1 mm from the rigid area is in the range from 2 to 5 MPa. For a given rubber, the MA10 modulus is the value of the tensile stress required for a 10% relative elongation of this rubber.

By contrast with the first prior art solution, the composition according to the invention makes it possible to avoid the drawbacks arising from the use of a plurality of layers. By contrast with the second prior art solution, the composition according to the invention makes it possible to maintain the galvanic contact between the support and each branch, and therefore to maintain a good radio frequency performance of the device.

The composition advantageously comprises an elastomer, preferably a diene elastomer. The elastomer is of the saturated or unsaturated type. The term "unsaturated diene elastomer" denotes a diene elastomer produced at least partially from conjugated diene monomers and having a content of units produced from conjugated dienes which is greater than 30% (molar %), preferably 50%. This diene elastomer is preferably chosen from the group consisting of the polybutadienes (BR), natural rubber (NR), synthetic polyisoprenes (IR), butadiene copolymers, isoprene copolymers and mixtures of these elastomers. The unsaturated diene elastomer is more advantageously an isoprene elastomer, preferably chosen from the group composed of natural rubber, synthetic polyisoprenes and mixtures of these elastomers.

The composition preferably comprises a resin.

The resin is of the hydrocarbon type and is chosen from the group consisting of cyclopentadiene (CPD) or dicyclopentadiene (DCPD) homopolymer or copolymer resins, terpene homopolymer or copolymer resins, C5 cut homopolymer or copolymer resins, and mixtures of these resins. Among the above copolymer resins, the hydrocarbon resin is advantageously chosen from the group composed of CPD/vinylaromatic copolymer resins, DCPD/vinylaromatic copolymer resins, CPD/terpene copolymer resins, DCPD/terpene copolymer resins, CPD/C5 cut copolymer resins, DCPD/C5 cut copolymer resins, terpene/vinylaromatic copolymer resins, C5 cut/vinylaromatic copolymer resins and mixtures of these resins.

Advantageously, the composition comprises 3 to 14 parts of oil per hundred parts by weight of elastomer.

The oil is an additive for imparting plasticity to the green rubber, thereby facilitating the production, notably the mixing, of the composition. The oil also imparts elasticity to the vulcanized rubber, enabling the vulcanized composition to deform under the effect of the stresses induced by the deformation of the tyre in use.

The oil is chosen from the group consisting of polyolefin oils, naphthenic oils, paraffin oils, DAE (Distillate Aromatic Extract) oils, MES (Medium Extracted Extract) oils, TDAE (Treated Distillate Aromatic Extract) oils, mineral oils and vegetable oils.

The oil and the resin can be used to adjust the properties of the transition layer, such as the maximum value of the modulus of elasticity after vulcanization, or the amplitude of the gradient of the modulus of elasticity between the composition and the adjacent tyre mixture after vulcanization.

The composition may also comprise a reinforcing filler. A carbon black is preferably used. However, carbon black evidently cannot be used in blends with other reinforcing fillers, particularly inorganic fillers, for example silica.

More particularly, suitable carbon blacks include any of the carbon blacks, notably blacks of the HAF, ISAF and SAF types, which are conventionally used in tyres and particularly in tyre treads. Non-limiting examples of these blacks which may be mentioned are the N115, N134, N234, N330, N339, N347 and N375 blacks.

If a silica is used, a highly dispersible precipitated silica is preferably used, particularly when the invention is used for the production of tyres having low rolling resistance. Non-limiting examples of these preferred highly dispersible silicas which may be mentioned include Ultrasil 7000 and Ultrasil 7005, made by Degussa, Zeosil 1165MP, 1135MP and II 15MP silicas made by Rhodia, Hi-Sil EZ150G made by PPG, Zeopol 8715, 8745 and 8755 silicas made by Huber, and treated precipitated silicas such as the aluminium doped silicas described in the application EP-A-0735088.

The composition may also comprise a cross-linking agent. It should be noted here that the term "cross-linking agent" denotes, in a known way, an agent capable of establishing a sufficient chemical and/or physical bond between the reinforcing filler and the elastomer. Cross-linking agents, notably silica/elastomer agents, have been described in a large number of documents, the best-known of these agents being bifunctional organosilanes having alkoxy functions.

The reinforcing filler can also be supplemented, according to the intended application, with inert (non-reinforcing) fillers such as particles of clay, bentonite, talc, chalk and kaolin, which can be used, for example, in sidewalls or treads of coloured tyres.

The composition may include some or all of the usual additives commonly used in compositions for tyre production, for example plasticizers, which may be aromatic or non-aromatic, pigments, protective agents such as anti-ozone waxes, chemical anti-ozone substances, anti-oxidants such as N-(1,3-dimethylbutyl)-N'-phenyl-P-phenylenediamine (6-PPD), anti-fatigue agents, methylene acceptors or donors acting as hardening agents (for example, HMT or H3M) as described, for example, in patent application WO02/10269 (or US2003-0212185), and adhesion promoters, for example cobalt salts.

The composition may also comprise a vulcanization accelerator, particularly an accelerator of the sulphenamide type such as one chosen from the group consisting of 2-mercaptobenzothiazole disulphide (MBTS), N-cyclohexyl-2-benzothiazole sulphenamide (CBS), N,N-dicyclohexyl-2-benzothiazole sulphenamide (DCBS), N-tert-butyl-2-benzothiazole sulphenamide (TBBS), N-tert-butyl-2-benzothiazole sulphenimide (TBSI) and mixtures of these compounds.

Preferably, the transition layer is made from the composition.

Advantageously, the transition layer is electrically insulating. This ensures good radio frequency operation of the device.

Optionally, the transition layer covers the whole of the antenna.

Because of the radio frequency properties related to the dielectric properties of the adjacent rubber, it is preferable to cover each branch of the antenna completely.

Advantageously, the assembly comprises an adhesion layer interposed between the electronic device and the transition layer.

The adhesion layer can be used to improve the attachment of the transition layer to the electronic device. In fact, the transition layer does not adhere easily to heterogeneous materials such as an epoxy resin, the tin of a soldered joint, the copper of a track or the plastic of some components of the electronic device.

Preferably, the average thickness of the transition layer is in the range from 1 mm to 1.5 mm, and preferably in the range from 1 mm to 1.2 mm.

This range of thicknesses prevents any short-circuiting with the adjacent conductive rubber of the tyre, ensures good radio frequency operation of the device, and finally improves the transition of stiffness.

In one embodiment, the assembly is separate from a green tyre blank or from the tyre.

The invention also proposes a green tyre blank comprising an assembly as defined above.

The invention further proposes a tyre comprising:
an electronic device having an electronic member and at least one antenna fixed to a support of the electronic member, the antenna comprising a part which is free with respect to the support, joined to a part for fixing the antenna to the support, and
a layer, called the transition layer, coating at least the junction between the free and fixing parts of the antenna and having a gradient of the sulphur content.

In the vulcanized tyre, the transition layer therefore has a gradient of the modulus of elasticity through its thickness. The sulphur content of the layer corresponds to the number of parts of sulphur per hundred parts by weight of elastomer (phr) of the layer.

BRIEF DESCRIPTION OF THE DRAWINGS

The invention will be more clearly understood from the following description which is provided solely by way of example and which refers to the drawings, in which.

DETAILED DESCRIPTION OF EMBODIMENTS OF THE INVENTION

Figure 1:
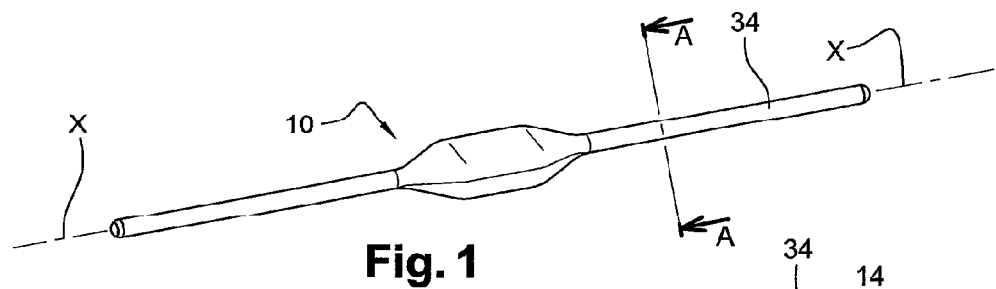
FIG. 1 is a perspective view of an assembly according to the invention.

FIGS. 1 to 4 show an assembly according to the invention, identified by the general reference 10 and intended for incorporation into a tyre, for example by being embedded in a body of rubber of the tyre. The assembly 10 is separate from the tyre and has a generally elongate shape along an axis X. In the illustrated example, the assembly 10 comprises an electronic device 12 of the RFID (an English abbreviation for "Radio Frequency Identification Device") type.

The device 12 comprises two antenna branches 14 and an electronic member 16. The electronic device 12 also comprises a support 18 carrying a chip 20 of the electronic member 16. The support 18 forms a printed circuit board on which is mounted the chip 20, which in this case is a passive radio frequency identification transponder.

The support 18 comprises means 21 of mechanical fixing and electrical connection between each branch 14 and the support 18. The means 21 comprise two troughs 22 for fixing each branch 14. Each branch 14 comprises a part 24 for fixing to the support 18, soldered into the trough 22. Each branch 14 also comprises a part 26 which is free with respect to the support 18 and is joined at 28 to the fixing part 24. Each branch 14 has a substantially helical shape about the axis X and has a length, an outside diameter and a helical pitch defined according to the conditions in which the electronic device is used. The two branches 14 form a dipole antenna.

Figure 2:
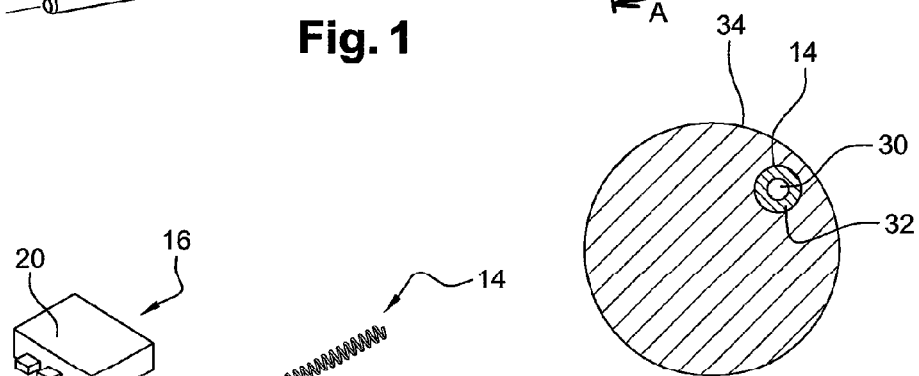
FIG. 2 is a sectional view on the plane A-A of the assembly of FIG. 1.
Figure 3:
FIG. 3 is a perspective view of an electronic member and an antenna of the assembly of FIG. 1.
Figure 4:
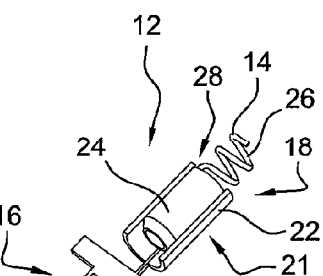
FIG. 4 is a detail view in perspective of an electronic device of the assembly of FIG. 1.

With reference to FIG. 2, each branch 14 comprises a steel core 30 having an outside diameter of 203 micrometers, plus or minus 5 micrometers. The core 30 may be coated with one or more conductive and/or chemically insulating and/or adhesion layers. In the example described, each branch 14 is coated with an adhesion layer 32 which directly coats the core 30. The layer 32 comprises a non-metallic adhesive, in the present case an adhesive marketed under the trade name "Chemlok" by the Lord Corporation or under the trade name "Chemosil" by the Henkel Company.

The assembly 10 also comprises a transition layer 34 between the device 12 and the adjacent rubber. The transition layer 34 directly coats the adhesion layer 32. Thus the adhesion layer 32 is interposed between the electronic device 12 and the transition layer 34. In a variant, the transition layer 34 coats the core 30 directly. The part of the transition layer 34 encasing the electronic member 16 and the support 18 has a generally ovoid or almond-like shape.

The layer 34 is electrically insulating and comprises a composition comprising at least one elastomer. Regarding the aspects more particularly related to the invention, the composition of the layer 34 comprises 9 to 13 parts of sulphur per hundred parts by weight of elastomer. The composition also comprises 3 to 14 parts of oil per hundred parts by weight of elastomer. In the present case, the layer 34 is constituted of the composition which forms a green rubber. Table 1 shows an example of the composition of the layer 34.

TABLE 1

| Composition of layer 34 | |
|---|---|
| Constituents | Composition of the layer 34 |
| Nature rubber | 100 |
| Carbon black | 14 |
| Antioxidant | 1.5 |

TABLE 1-continued

| Composition of layer 34 | |
|---|---|
| Constituents | Composition of the layer 34 |
| Oil | 3 |
| Colophony | 3 |
| Resin | 15 |
| Diphenylolpropane | 7 |
| Adhesion promoter | 3 |
| Zinc oxide | 8.5 |
| Stearic acid | 0.6 |
| Hardener | 7.35 |
| Sulphur | 10 |
| Accelerator | 3.1 |
| Silica | 65 |
| Cross-linking agent | 10.4 |

The layers 32 and 34 coat the whole of the device 12. In a variant, the layers 32 and 34 coat the device 12 only partially, while coating, in particular, the junction 28 between the fixing part 24 and the free part 26 of each branch 14.

The layers 32 and 34 are green, that is to say unvulcanized. The layer 32 has an average thickness in the range from 10 to 20 μm. The layer 34 is formed from two strips of rubber or "skims", between which the device 12 is interposed. Each strip has an average thickness E1 in the range from 1 mm to 1.5 mm, preferably in the range from 1 mm to 1.2 mm, so that the total thickness of the layer 34, from one free edge to the other, has an average thickness 2×E1 in the range from 2 mm to 3 mm, preferably from 2 mm to 2.4 mm.

When incorporated in the tyre, the assembly 10 can prevent the risk of breakage of the junction 28. The assembly 10 is encased in an adjacent rubber of a green blank of the tyre and is then vulcanized with the blank.

Figure 5:
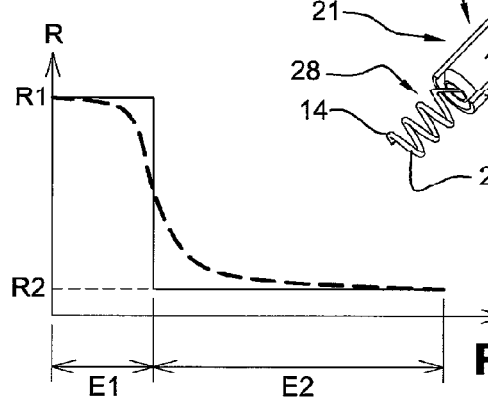
FIG. 5 shows curves of variation of the modulus of elasticity of bodies of rubber which encase the electronic device of FIG. 4, in the case of separate and simultaneous curing of the different layers encasing the device.

FIG. 5 shows the variations of the stiffness modulus of a first body of vulcanized rubber encasing a device similar to that of FIGS. 1 to 4, as a function of the radial distance with respect to the axis X (curve shown in solid lines). The first body of vulcanized rubber comprises a transition layer of rubber with a high sulphur content and an adjacent rubber layer with a lower sulphur content, in which the assembly comprising the device and the vulcanized transition layer of rubber is incorporated. The transition layer and the adjacent layer are vulcanized separately.

The vulcanized transition layer of rubber has an average thickness E1 and a stiffness modulus R1. The vulcanized adjacent layer of rubber has an average thickness E2 and a modulus of elasticity R2 which is less than R1. The variation of the modulus of elasticity of the first body of rubber takes the form of a step. Thus the variation of the modulus of elasticity is abrupt and the risk of breakage of each branch 14 under the effect of the stresses caused by the deformation of the tyre while rolling is high.

FIG. 5 also shows the variations of the modulus of elasticity of a second body of vulcanized rubber encasing the device of FIGS. 1 to 4, as a function of the radial distance with respect to the axis X (curve shown in broken lines). The second body of rubber belongs to a tyre vulcanized according to the invention. The tyre was manufactured according to the invention by vulcanizing a green blank comprising the assembly 10 comprising the layer of green rubber 34 encased in an adjacent layer of green rubber. The green rubber of the layer 34 has a sulphur content which in this case is in the range from 9 to 13 parts of sulphur per hundred parts by weight of elastomer, and which is greater than the sulphur content of the green rubber of the adjacent layer, in this case less than 5 parts of sulphur per hundred parts by weight of elastomer. The transition layer and the adjacent layer are vulcanized simultaneously.

The variation of the modulus of elasticity in this case takes the form of a continuous, regularly decreasing curve. During vulcanization, the sulphur diffuses to the interface formed by the layer 34 and the adjacent layer of rubber. Thus, over the thickness E1, the sulphur content, and therefore the modulus of elasticity, of the layer 34 decreases as the proximity to the interface increases. Thus, over the thickness E2, the sulphur content, and therefore the modulus of elasticity, of the layer 34 increases with increasing proximity to the interface.

The second body of rubber, notably the transition layer 34, therefore has a gradient of sulphur content, in this case a negative gradient of the sulphur content in the direction away from the axis X. Consequently there is a corresponding gradient of the modulus of elasticity.

The invention is not limited to the embodiment described above.

The invention claimed is:

1. An electronic assembly for installation in a tire, the assembly comprising:
    an electronic device that includes:
        an electronic member including a support, and
        at least one antenna fixed to the support, each antenna of the at least one antenna including a free part, which is free with respect to the support, joined to a fixing part, which fixes the antenna to the support; and
    a transition layer formed of at least a composition that includes:
        an elastomer, and
        9 to 13 parts of sulfur per hundred parts by weight of the elastomer,
    wherein the transition layer coats at least a junction between the free part and the fixing part of each antenna of the at least one antenna.

2. The electronic assembly according to claim 1, wherein the composition includes a resin.

3. The assembly according to claim 1, wherein the composition includes 3 to 14 parts of oil per hundred parts by weight of the elastomer.

4. The assembly according to claim 1, wherein the transition layer is formed of the composition.

5. The assembly according to claim 1, wherein the transition layer covers an entirety of each of the at least one antenna.

6. The assembly according to claim 1, further comprising an adhesion layer interposed between the electronic device and the transition layer.

7. The assembly according to claim 1, wherein an average thickness of the transition layer is in a range of from 1 mm to 1.5 mm.

8. The assembly according to claim 7, wherein the average thickness of the transition layer is in a range of from 1 mm to 1.2 mm.

9. The assembly according to claim 1, wherein the assembly is separate from the tire and separate from a green tire blank.

10. The assembly according to claim 1, wherein the assembly is incorporated in a green tire blank.

11. A tire comprising:
    an electronic device that includes:
        an electronic member including a support, and
        at least one antenna fixed to the support, each antenna of the at least one antenna including a free part, which is free with respect to the support, joined to a fixing part, which fixes the antenna to the support; and
    a transition layer coating at least a junction between the free part and the fixing part of each antenna, the transition layer having a gradient in a sulfur content thereof.

\* \* \* \* \*